Jan. 21, 1964     W. M. McCONNELL ETAL     3,118,546
APPARATUS FOR HANDLING ELONGATED ARTICLES
Filed Nov. 3, 1961     6 Sheets-Sheet 1

INVENTORS
William M. McConnell
Raymond L. Carey
BY Webb, Mackey & Burden
THEIR ATTORNEYS

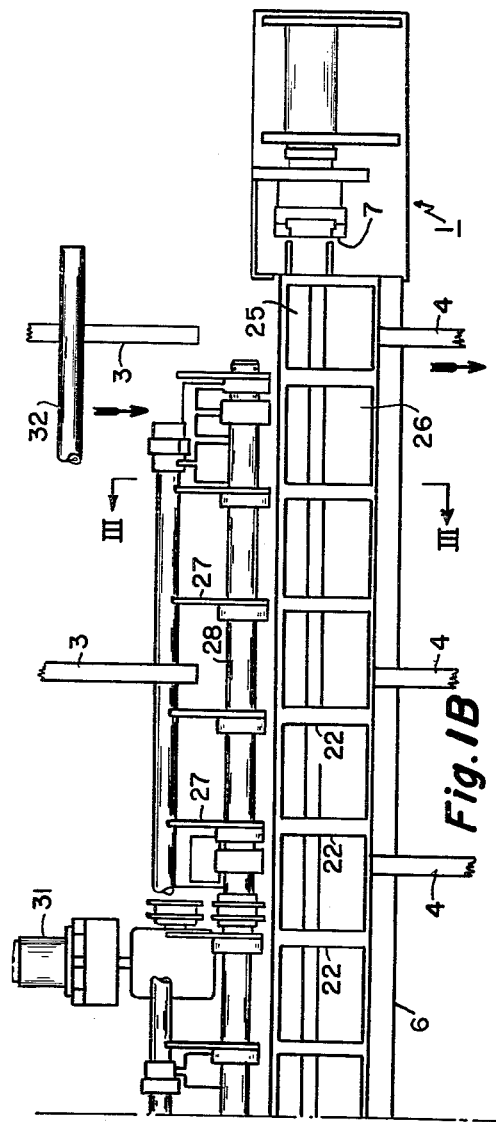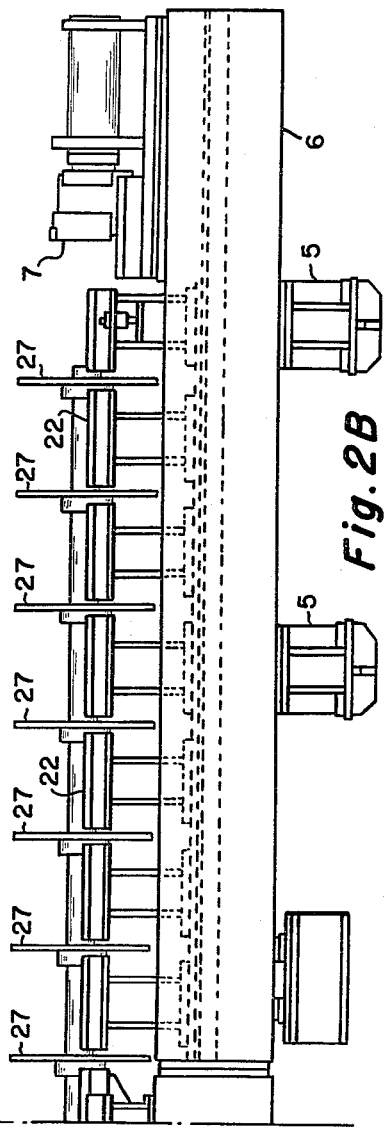

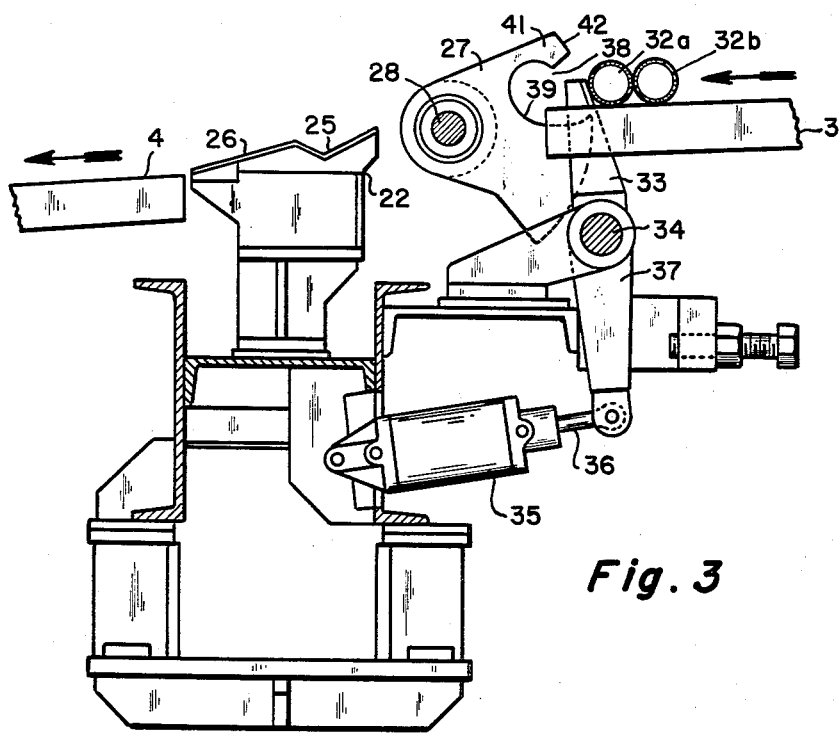
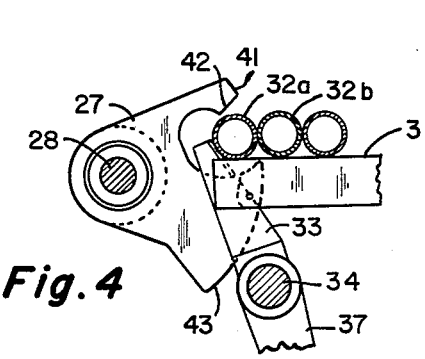
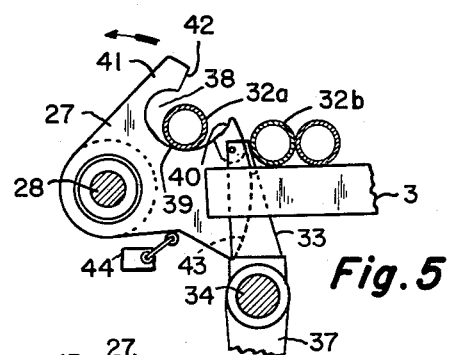
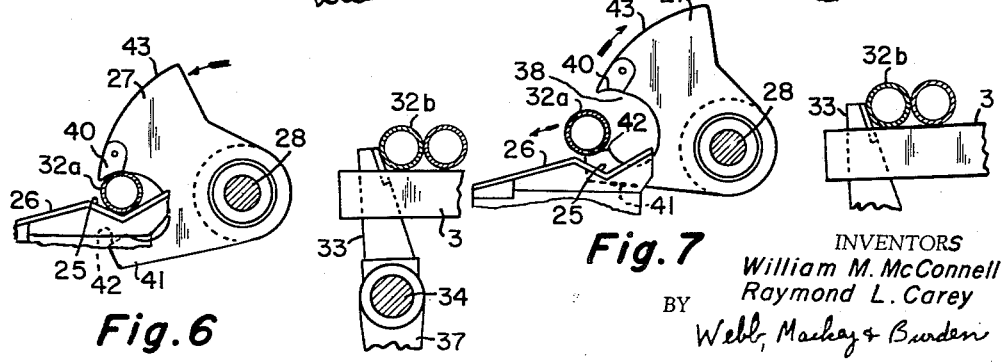

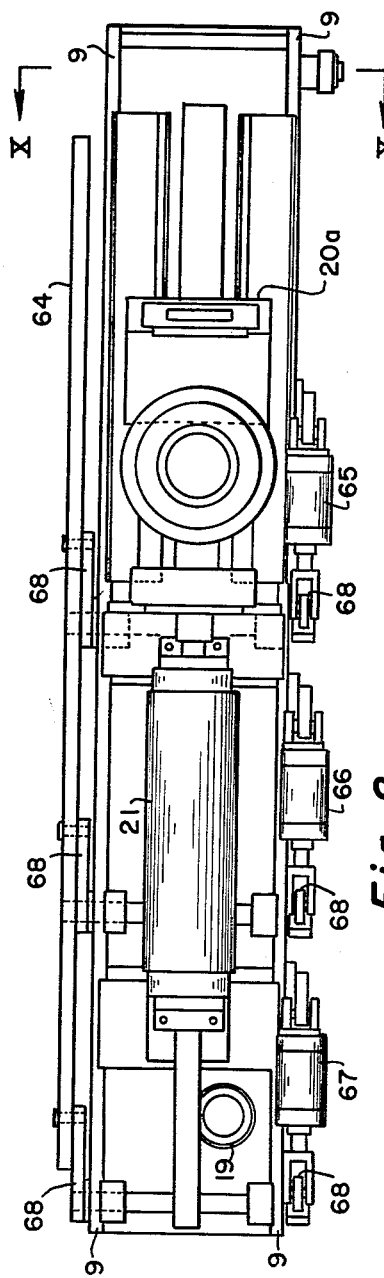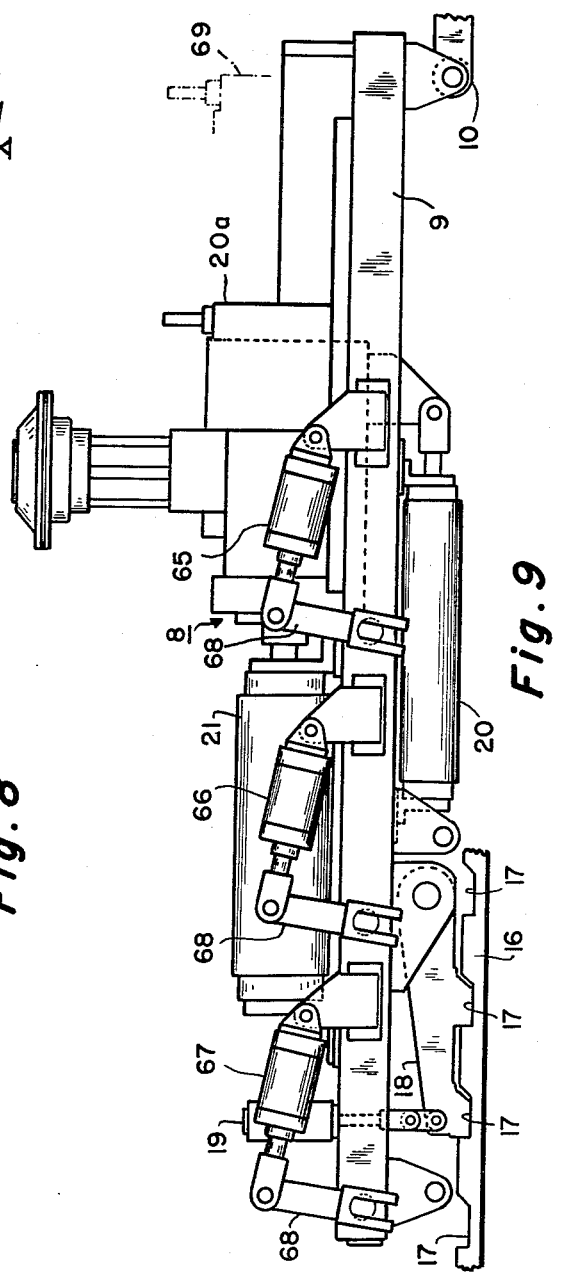
Jan. 21, 1964 W. M. McCONNELL ETAL 3,118,546
APPARATUS FOR HANDLING ELONGATED ARTICLES
Filed Nov. 3, 1961 6 Sheets-Sheet 4
INVENTORS
William M. McConnell
Raymond L. Carey
BY Webb, Mackey & Burden
THEIR ATTORNEYS

United States Patent Office 3,118,546
Patented Jan. 21, 1964

3,118,546
APPARATUS FOR HANDLING ELONGATED
ARTICLES
William M. McConnell and Raymond L. Carey, Pittsburgh, Pa., assignors to Taylor-Wilson Manufacturing Co., Pittsburgh, Pa., a corporation of Pennsylvania
Filed Nov. 3, 1961, Ser. No. 149,923
21 Claims. (Cl. 214—1)

This invention relates to apparatus for handling and performing an operation upon elongated articles such as pipe, tubes, rods, rails, beams, etc., and more particularly to handling apparatus which receives an elongated article and transfers it into a machine wherein both ends are engaged and an operation is performed thereon. Examples of operations performed in the case of pipe include, but are not limited to, threading, tapering, facing, cutting off, coupling attachment, testing, expanding, and others.

In performing the foregoing operations upon pipe where both ends are engaged or supported in the machine, differences in length between successive pipe require adjustment in position of at least one of the two components of the machine which engages end portions of the pipe. This is particularly true in pipe testing and expanding machines which subject the pipe to internal hydraulic pressures where each end of the pipe is sealingly engaged by a head of the machine. At least one of these heads is movable toward and away from the other to accommodate the different lengths. Usually, there are intermediately of the heads a plurality of spaced apart saddles or supports which engage the pipe between its ends and maintain it in position for internal pressurizing. Accordingly, when a shorter or longer pipe than the one in the machine is to be pressurized, at least one of the saddles must be moved into or out of a position at which it assists in supporting the pipe between the heads. This movement occurs when one of the heads is relocated for the different length pipe. Thus, for high production rates and efficient operation, fast movement of these saddles into and out of pressurizing position is highly desirable.

In combination with the pipe pressurizing machines is a pipe handling apparatus which receives pipe and conveys it into the machine for hydraulic testing and/or expansion. Preferably, the handling apparatus is laterally of the machine but close thereto so that the pipe travels a short path in its delivery into the machine and thereby reduces handling time to a minimum. While the handling apparatus should be close to the machine, it must not engage either head during transfer; otherwise, serious damage may result to the handling apparatus and/or the machine. Accordingly, those elements of the pipe handling apparatus opposite the head which is relocated for each different length of pipe must not operate when conveying pipe into the machine.

During hydraulic pressurizing, clamps normally engage the pipe intermediate its ends at spaced apart intervals to insure maintenance in the pressurizing position. Usually, the clamps are separate components from the pipe handling apparatus, thereby requiring an additional motor device for operating them to engage and disengage the pipe. Thus, a pipe handling apparatus which not only conveys pipe into the machine but also assists in clamping or supporting it in pressurizing position and cooperates in removing the pipe from pressurizing position after completion of hydraulic testing or expansion can effect a substantial savings in costs of the handling equipment.

Our invention in apparatus for handling elongated articles has ability to quickly and efficiently move supports for the article into and out of position to accommodate different lengths. Additionally, it transfers articles of different lengths into a machine which performs an operation thereon without interfering or colliding with a movable element such as a head of a tester or expander which must be relocated for each different length of pipe. Also, our handling apparatus assists in clamping the article in a position in the machine where an operation is performed thereon and cooperates in removing the article from the position after completion of the operation. Specifically, our invention relates to a combination in an apparatus which performs an operation upon an elongated article and which has a frame and a first member for engaging one end portion of the article. The combination comprises a chain disposed on the frame and extending longitudinally thereof for movement therealong. This chain is spaced apart from the first member and has connected to it a carriage which moves therewith. The carriage mounts a second member for engaging the opposite end portion of the article and at least one saddle intermediate the two members for supporting the article between its ends. The saddle is movable with the chain which is adapted to be drivingly connected to a motor means for moving it along the frame to cause the carriage and saddle to travel a path towards and away from the first member.

Interposed between the two members on the frame is a sprocket in engagement with the chain so that the chain travels therearound and also so that the saddle travels therearound into and out of a location at a lower level on the frame than the carriage and out of the path of travel of the carriage when the second member reaches a given position along the frame.

Extending longitudinally of the frame along at least a part of the length of the chain is a shaft disposed laterally of the two members. A plurality of spaced apart article transfer elements are upon the shaft along its length and disposed substantially transversely thereof. These article transfer elements are rotatable between a first position whereat the article is received thereby and a second position whereat the article is located in the apparatus for engagement by the two members. The shaft is adapted to be drivingly connected to a shaft motor for rotating the article transfer elements between the first and second positions.

Each of the article transfer elements has a portion for receiving the article for transfer from the first position to the second position.

The shaft has a clutch means engageable with and disengageable from each article transfer element opposite said chain for control of rotation of each of the article transfer elements opposite the chain between the first and second positions. Each clutch means has a control means connected thereto for disengaging its clutch means upon engagement by an actuating element carried by the second member. The actuating element is positioned for engaging those control means which regulate rotation of those article transfer elements opposite the second member when it is at a given position along the chain.

One preferred article transfer member is a disk; however, other article transfer elements such as fingers which form a receiving receptacle for pipe and the like can also be used with satisfactory results.

In the accompanying drawings we have shown a preferred embodiment of our invention in which:

FIGURES 1A and 1B matched together along a match line are a plan view of one embodiment of our invention applied to a pipe tester and pipe handling apparatus;

FIGURES 2A and 2B matched together along a match line are a side elevation view of the embodiment of FIGURES 1A, 1B;

FIGURE 3 is a section view along the line III—III of FIGURE 1B;

FIGURES 4–7 inclusive are side elevation views of the disk of FIGURE 3 in various positions during conveying and testing pipe;

FIGURE 8 is an enlarged plan view of the traveling carriage and head of the embodiment of FIGURE 1;

FIGURE 9 is a side elevation view of the carriage and head of FIGURE 8;

Figure 1A:
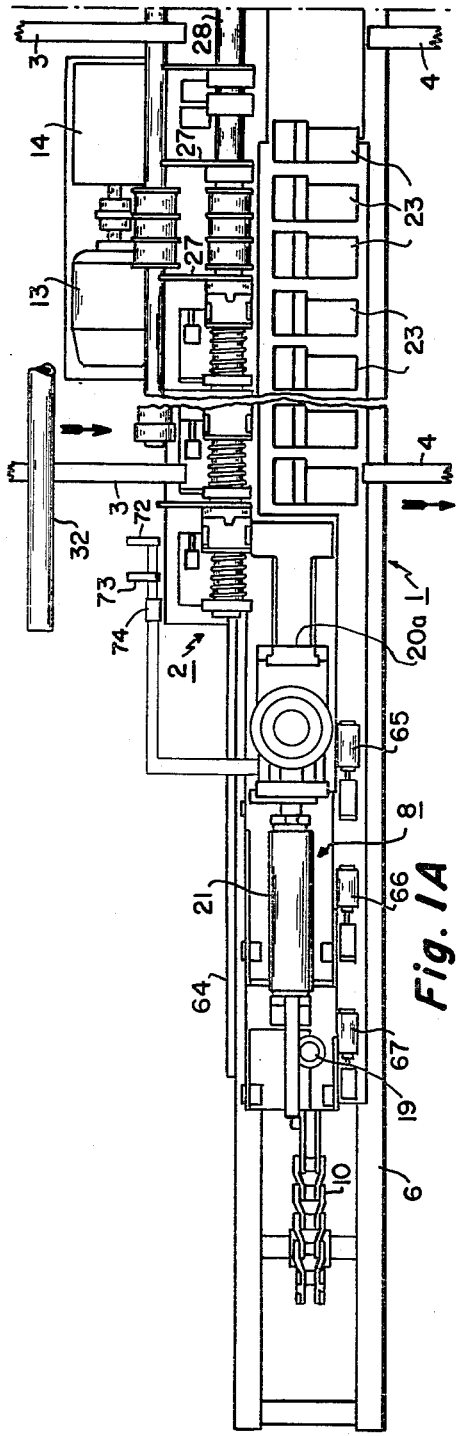

Referring to FIGURES 1A, 1B, 2A, 2B, 3 and 8–11, we have shown our invention applied to a pipe test machine 1 and a pipe handling apparatus 2 which picks off pipe from entry skids 3, conveys it into the machine, and kicks it out of the machine onto exit skids 4. The pipe testing machine comprises vertically disposed supports 5 which carry a horizontal frame 6. Mounted upon the frame are two spaced apart heads which sealingly engage the ends of the pipe. Head 7 is fixed to one end of the frame while the other head 8 is movable and installed upon a carriage 9 which travels on the frame toward and away from the head 7 to accommodate different lengths of pipe.

The two heads subject the pipe to internal hydraulic pressures by delivering water under pressure thereto to ascertain soundness of the pipe and its ability to withstand predetermined amounts of pressure as required by specification.

Figure 2A:
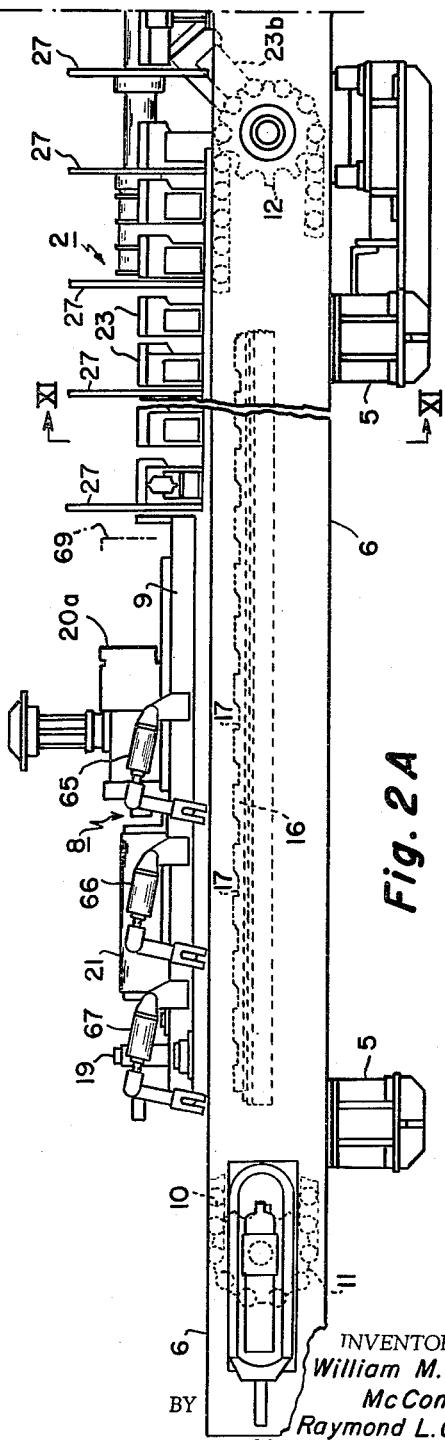
Figure 10:
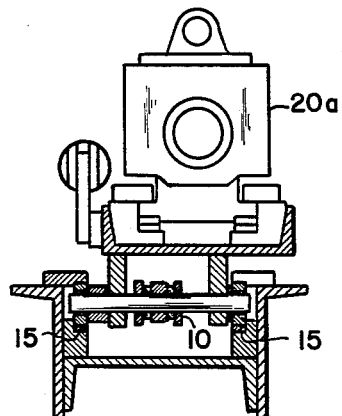
FIGURE 10 is a section view along the line X—X of FIGURE 8.

As shown in FIGURES 1A, 2A, 9 and 10, the carriage is mounted upon an endless chain 10 which extends between two vertically positioned sprockets 11 and 12 rotatably situated on the frame 6. A motor 13 operating through gearing 14 drives the sprocket 12 to move the carriage towards and away from the fixed head. The chain rides in upper ways 15 (FIGURE 10) which are welded to the frame and extend lengthwise on both sides thereof. Since the head need not travel the entire length of the frame, the chain extends only a part of the length of the frame (FIGURE 2A).

To affix the carriage and the head in a given position along the frame, we provide a rack 16 having spaced apart notches 17 for receiving and engaging a pivoted pawl 18 supported by the carriage 9. The rack extends parallel to the upper ways 15 on the frame and between the two sprockets 11 and 12. An air cylinder 19 joined to one end of the pawl 18 and disposed upon the carriage lowers the pawl into engagement with the rack to lock the carriage at a predetermined position along the frame for a given length of pipe. After completion of testing a pipe and in the event the next pipe to be tested is different in length from the one just tested, the cylinder 19 raises the pawl from engagement with the rack to permit travel of the carriage in either direction to accommodate the next pipe.

The movable head 8 includes a set-out cylinder 20 for advancing its pipe end sealing member 20a into engagement with the end of the pipe after the carriage has been locked in a given position along the rack and for retracting the head from sealing engagement with the pipe upon termination of testing. Additionally, the head has a hydraulic lock cylinder 21 for locking the head in a set-out position for the pipe testing period.

Intermediately of the two heads are two groups of spaced apart saddle arranged in tandem for receiving and supporting pipe in a test position whereat it is subjected to hydraulic pressures. The first group comprises saddles 22 affixed to the frame as shown in FIGURE 3 so that they are immovable and located between the fixed head 7 and the sprocket 12.

Figure 11:
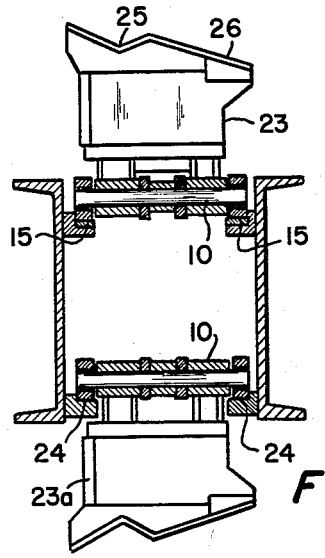
FIGURE 11 is a section view along the line XI—XI of FIGURE 2A.

The second group comprises saddles 23 which are mounted upon the chain (FIGURE 11) and, therefore, travel therewith along the frame toward and away from the fixed head. Since the saddles are mounted upon the chain at least some of them travel around the sprocket 12 to a location on the frame at a lower level than the movable head 8 and carriage 9 when the carriage advances towards the fixed head. This is shown in FIGURE 11 where saddle 23a has moved around the sprocket and hangs downwardly from the chain 10 which rides lower ways 24 connected to the frame for support underneath the carriage. FIGURE 2A shows saddle 23b midway between those saddles such as 22 and 23 in test position and those saddles such as 23a (FIGURE 11) underneath the carriage.

Mounting the saddles upon the chain is highly advantageous for efficient operation of the machine because additional ones can be brought into test position for longer lengths of pipe and some can be quickly moved out of test position for shorter lengths of pipe by merely driving sprocket 12 in the proper direction. Accordingly, when the carriage requires movement to a new location along the frame to accommodate a different length of pipe, the required number of saddles for supporting the pipe are automatically positioned by travel of the chain. Therefore, a workman need not walk along the testing machine moving saddles into or out of test position each time a different length of pipe is to be tested.

Each saddle of the two groups has a V-shaped notch 25 which receives and supports the pipe and has a downwardly sloping surface 26 connected to the exit side of the notch. This surface extends to the delivery skids 4 and assists in removal of the pipe from the machine as will be described hereinafter.

The saddles are in line as are the V-shaped notches which fall along the center line of the two heads and thereby support pipe in test position whereat each head sealingly engages an end thereof for hydraulic pressurizing.

Transfer of the pipe from the entry skids 3 onto the saddles results from operation of a plurality of spaced apart disks 27 shown as cam shaped and mounted upon a first rock shaft 28 for rotation therewith. As shown in FIGURES 1A, 1B and 3, the rock shaft extends parallel to the frame for substantially the length between the two heads when furthest apart. It is also laterally of the saddles and located between the entry skids and the saddles. Bearings 29 carried by uprights 30 (FIGURE 12) support the shaft and an air motor 31 (FIGURE 1B) drivingly connected thereto rotates the shaft and its disks between pipe receiving position (FIGURES 3 and 4) and pipe delivery and clamping position (FIGURE 6).

Each disk 27 is disposed transversely of the rock shaft 28 and has a peripheral notch 38 which extends inwardly to form a receptacle 39 for pipe received therein. During travel from pipe receiving position to delivery and clamping position, the pipe lies in the receptacle 39 of the disks (FIGURE 5).

Integral with the receptacle and opposite thereto at the periphery of the disk is a hook portion 40 which functions as a clamp to hold the pipe down upon the saddles during testing (FIGURE 6). Opposite the hook portion, spaced across the notch therefrom and connected to the receptacle 39 is a kick-out arm 41 whose pipe engaging surface 42 inclines downwardly towards the sloping surface 26 of the saddles when the disk is in kick-out position (FIGURE 7). Thus, when the disk travels from clamping position back towards pipe receiving position, the kick-out arm engages and lifts the pipe out of the notch 25, thereby transferring it onto the sloping surface 26. Next, the pipe rolls down along the sloping surface onto the exit skids 4 and away from the machine.

Referring to FIGURES 3–7 inclusive, pipe 32a to be tested is held back on entry skids 3 by a plurality of spaced apart stop arms 33 mounted upon a second rock shaft 34 which extends parallel to the first rock shaft and laterally and slightly below it. This second rock shaft 34 is rotated through a short arc by a cylinder motor 35, one end of whose piston rod 36 is connected to a rock lever 37 joined to the second rock shaft. As shown in FIGURE 3, stop arm 33 is in hold position where it engages the pipe 32a to be tested at a position just in front of the disk 27 which is in pipe receiving position (FIGURES 3 and 4). When a pipe is to be transferred from the entry skid 3 into the machine 1, the cylinder motor 35 moves lever 37 through a short counterclockwise arc and thereby advances stop arm 33 to a pick-off position (FIGURE 4) where the pipe 32a is allowed to roll into the peripheral notch 38 of the disk 27 and to a location where the disk can engage and pick it off the entry skids without picking off the pipe 32b behind it.

Once the disk has rotated in a counterclockwise direction from the pipe receiving position towards the pipe delivery and clamping position through a short arc to the position of FIGURE 5, a peripheral part 43 of the disk engages the next pipe 32b to be tested and holds it back. When the disk reaches this hold-back position of FIGURE 5, a limit switch 44 opens and through a conventional control system (not shown) causes motor cylinder 35 to operate and move lever 37 back to the position of FIGURE 3, thereby advancing stop arm 33 into engagement with pipe 32b. Thus, stop arm retains the pipe 32b in the position of FIGURE 5 until the disk 27 returns for it. The limit switch 44 is closed when the disk rotaes to pipe receiving position.

Figure 12:
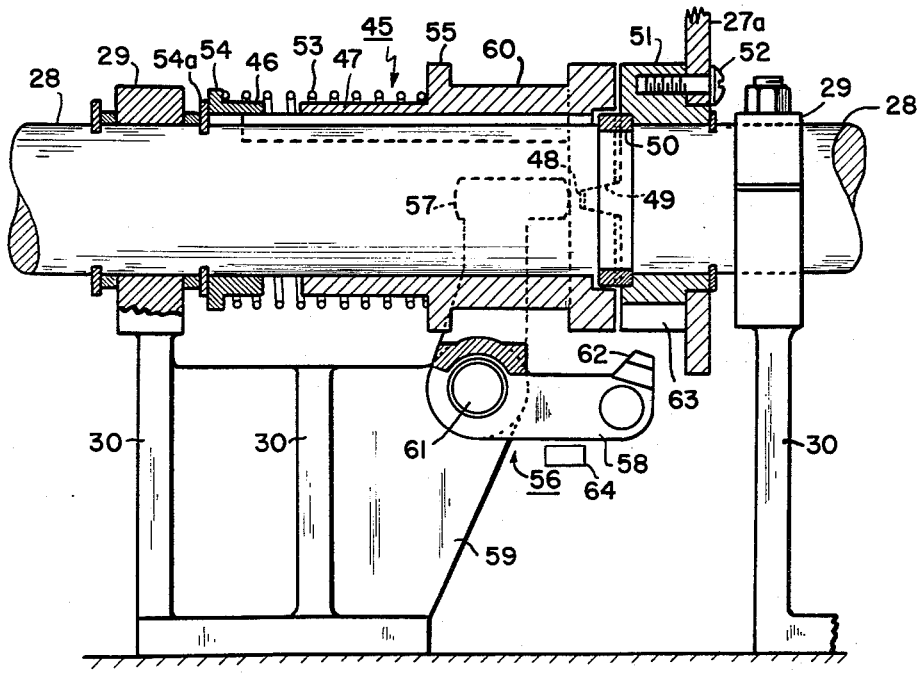
FIGURE 12 is an enlarged side elevation view in section of a part of the shaft which mounts the disks and of a clutch which regulates operation of one of the disks.

Since the disks are arranged along substantially the length of the first rock shaft 28 and since in delivering pipe onto the saddles some of them travel a route which intersects the movable head 8 when advanced to positions for accommodating pipe shorter than maximum length for which the machine is designed, we provide a part of the rock shaft 28 with a plurality of clutches, each of which controls operation of a disk opposite the chain 10. FIGURE 12 shows one such clutch 45 which comprises a collar 46 and a slidable sleeve 47 spaced apart from the collar with both collar and sleeve keyed to the shaft 28 for rotation therewith. The sleeve slides along the shaft and includes a pair of slots 48 spaced 180° apart (only one slot shown) for receiving and engaging a pair of projections 49 (one shown) similarly spaced and an integral part of a coupling ring 50 connected to a support collar 51. A plurality of bolts, such as bolt 52, joins those disks such as disk 27a opposite the chain to their respective support collars.

The disk 27a, support collar 51, and coupling ring 50 rotate with the shaft 28 when the projections 49 are in the slots 48 but, when the clutch is disengaged and the projections are out of the slots, then the disk remains stationary during rotation of the shaft 28. A coil spring 53 anchored at one end to shoulder 54 of the collar 46, which is held in position along the shaft by lock ring 54a, is in engagement with sleeve shoulder 55 and normally urges engagement of the clutch with the disk by forcing the sleeve toward the disk so that slots 48 of the sleeve receive the projections 49. FIGURE 12 shows the clutch engaged with the disk.

Disengagement of the clutch from the disk results from operation of a clutch actuating mechanism 56 comprising a pivoted yoke 57 and crank 58 carried by a bracket 59 joined to uprights 30. The yoke 57 fits into a peripheral groove 60 of the sleeve 47 and has its lower end connected to a pivot pin 61 rotatable upon the bracket 59. The crank 58 has one end joined to the pivot pin 61 and carries a lock projection 62 at the other end. As shown in FIGURE 12, the lock projection is opposite a cavity 63 in the bottom part of the support collar 51 when the disk is in pipe receiving position. This cavity is located on the support collar so that it is in position to receive the lock projection of the crank with the disk in pipe receiving position. When the crank 58 rotates in a clockwise direction from that of FIGURE 12 about the pivot pin 61, the lock projection enters the cavity and locks the disk in pipe receiving position. The yoke 57 moves also in a clockwise direction about the pivot pin 61, thereby forcing the sleeve against the spring to move it towards the collar 46 and carry slots 48 out of engagement with the projections 49 of the coupling ring 50. In this way, the clutch is disengaged from the disk and rotation thereof is prevented.

A horizontal load bar 64 mounted by the carriage 9 and extending substantially the length thereof engages those cranks of the clutch actuating mechanisms opposite the carriage when it is raised from the position of FIGURES 8 and 9 by cylinder motors 65, 66 and 67. These cylinder motors are connected to the load bar 64 through linkage 68, whereby simultaneous operation of the three motors lifts the load bar into engagement with the cranks to disengage the clutches controlled thereby and simultaneously locks those disks opposite the carriage in pipe receiving position.

Before the carriage is moved from its position along the frame to a new one for a different length of pipe, the disks are rotated to pipe receiving position and the load bar is down (position of FIGURE 8) and out of engagement with any cranks which control disengagement of the clutches. Next, the carriage is moved to the new position on the frame to accommodate a different length of pipe and there locked in position by lowering the pawl into engagement with those notches of the rack opposite it. Then the three cylinder motors operate to raise the load bar and engage the cranks of those clutch actuating mechanisms which control rotation of those disks opposite the head when in full set-out position, as indicated by line 69 (FIGURE 9). Accordingly, those disks are locked in pipe receiving position and their clutches disengaged to avoid interference with the movable head 8 when at least some of remaining disks pick off the next pipe and transfer it into the machine.

Figure 13:
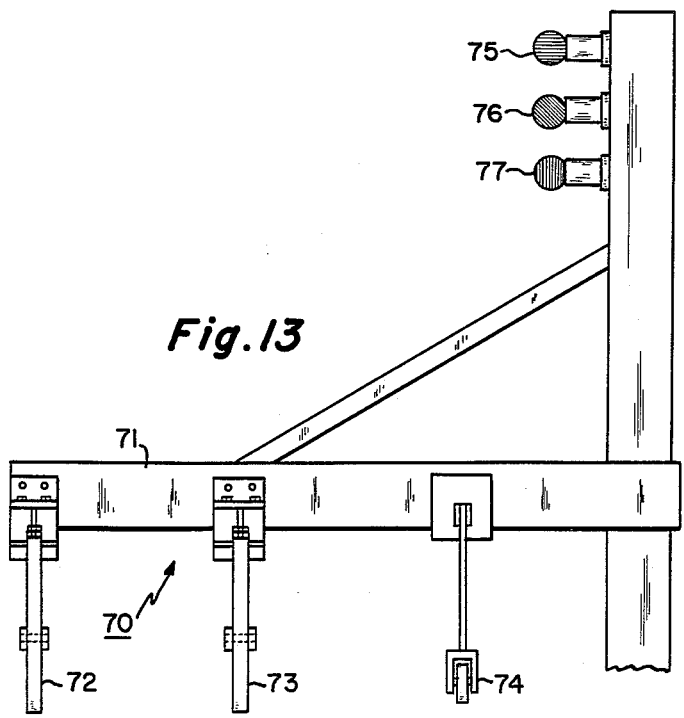
FIGURE 13 is a side elevation view of a probe and signal combination for indicating length of the next pipe to be delivered into the pipe tester of FIGURE 1.

To quickly and accurately position the movable head 8 for each length of pipe to be transported into the machine, we provide a probe and signal combination 70 (FIGURE 13). Connected to the movable head 8 and extending in advance of the sealing member 20a thereof towards the fixed head 7 is a bracket channel 71 which mounts a first probe 72 and a second probe 73 spaced apart from the first one and further from the fixed head than the first one. Also on the bracket channel is a limit switch 74 spaced apart from the second probe 73 and further from the fixed head 7 than the second probe. The bracket channel is laterally of the head 8 on the same side as the disks and positioned in line with the next pipe 32a to be tested on the entry skids 3.

Figure 14:
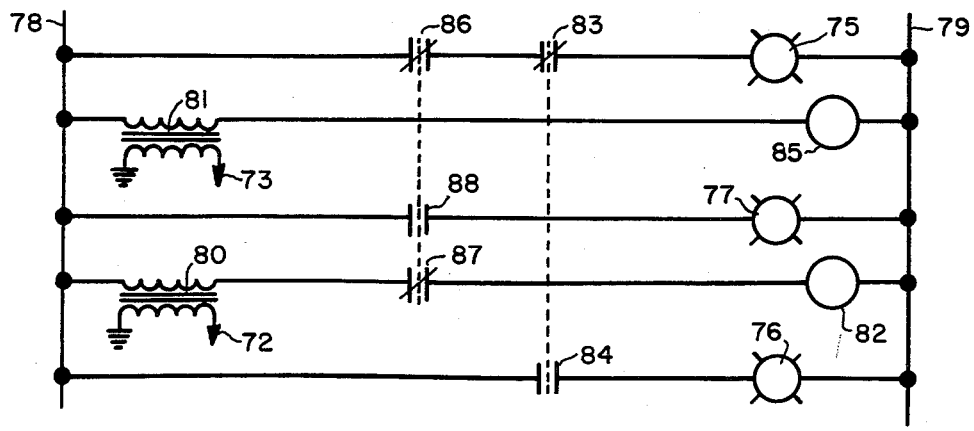
FIGURE 14 is a schematic wiring diagram for the probe and signal combination of FIGURE 13.

The two probes are in an electrical circuit with three signal lights, one blue 75, one green 76, and one red 77 (FIGURES 13 and 14) which, when illuminated, indicate position of the movable head 8 relative to the adjacent end of next pipe to be tested. When neither probe is in contact with the next pipe, the blue light is on indicating that the next pipe is too short for the present location of the movable head. When the first probe contacts the pipe and the second one does not, the green light illuminates to indicate that the head is in proper position to receive the next pipe. When both probes contact the pipe, the red light is on, thereby indicating that the next pipe is too long for the present location of the movable head and should not be delivered into the machine. FIGURE 14 shows diagrammatically one electrical circuit which operates as described above wherein there is an electrical interlock which illuminates only one light of the three lights for the three described situations.

Referring to FIGURE 14, lines 78 and 79 are in circuit with an electrical power source (not shown) and probe 72 and probe 73 are each part of low voltage transformers 80 and 81, respectively. The next pipe on the entry skid is grounded through the machine so the contact of the pipe by the probe 72 places in circuit both lines 78 and 79, transformer 80, and a relay 82 which opens its normally closed contact 83 to shut off the blue light 75 and which closes its normally open contact 84 to illuminate the green light 76. Contact of the pipe by the probe 73 completes an electrical circuit wherein a relay 85 opens its normally closed contact 86 to open the circuit for the blue light, opens its normally closed contact 87 in the circuit of relay 82 to turn off the green light, and closes its normally open contact 88 to light the red light 77.

As shown, contact 83 of relay 82, and contact 86 of relay 85 are normally closed, so that if neither probe contacts the next pipe, the blue light is on.

In the event the limit switch 74 engages the next pipe, it operates a conventional master control (not shown) to shut down the test machine and disk apparatus.

The notches in the rack, the spacing apart of the clutch controlled disks 27a, and the spacing apart of the saddles 23 mounted upon the chain are matched positionwise so that when the pawl is dropped into engagement with the rack, operation of the load bar locks in pipe receiving position each disk opposite the movable head when in full set-out position as well as when in the position of FIGURE 9 where the pipe end sealing member has not been set-out. Thus, upon operation of the disks for pipe transfer from the entry skids into the machine, there is no interference between the disks and the movable head. Additionally, the saddles on the chain are so located therealong relative to the clutch controlled disks that when the pawl is dropped into engagement with the rack, each clutch controlled disk is opposite a saddle mounted upon the chain, thereby affording each disk ability to clamp a transferred pipe down upon a chain mounted saddle.

Our invention has important advantages which render it highly useful to manufacturers and fabricators of elongated articles. In the first place, mounting of at least some of the saddles and the movable head upon the chain provides fast, efficient and automatic location of the required number of saddles in test position for different lengths of pipe.

In the second place, the combination of the disks, the clutches which individually control rotation of some of the disks, the clutch actuating mechanisms, and the load bar carried by the movable head is a versatile elongated article handling apparatus which achieves the following operations: (1) picks off the pipe from entry skids; (2) conveys it from the entry skids into a machine for performance of an operation thereon; (3) clamps the pipe in the machine during performance of the operation; (4) kicks out or ejects the pipe from the machine after completion of the operation; (5) avoids interference of the disks with the movable head for different lengths of pipe.

In the third place, the movable head mounts a signal indicating combination for accurately informing an operator where to position the movable head for the next pipe to be delivered into the machine.

While we have shown and described a preferred embodiment of our invention, it is to be understood that it may be otherwise embodied within the scope of the following claims.

We claim:
1. In apparatus for subjecting pipe to internal hydraulic pressures, said apparatus having a frame and a first head for sealingly engaging one end of a length of pipe, the combination comprising a chain disposed on said frame, extending longitudinally thereof for movement therealong and in engagement with a sprocket carried by said frame, a carriage connected to said chain and movable therewith, said carriage mounting a second head for sealingly engaging the opposite end of said pipe, at least one saddle mounted upon said chain intermediate said two heads for supporting said pipe between its ends, said saddle being movable with said chain, said chain being adapted to be drivingly connected to motor means for moving it along said frame to cause said carriage and said saddle to travel a path towards and away from said first head, said sprocket being disposed between said heads and spaced apart from said first head so that said chain travels therearound into and out of said path of travel of said carriage at a location spaced apart from said first head and so that said saddle travels therearound into and out of a position at a lower level on said frame than said carriage and out of said path of travel of said carriage when said second head reaches a given place along said frame.

2. The combination of claim 1 characterized by a shaft extending longitudinally of said frame along at least a part of the length of said chain and being laterally of said two heads, a plurality of spaced apart pipe transfer members mounted upon said shaft along its length and disposed substantially transversely thereof, said pipe transfer members being rotatable between a first position whereat a pipe is received thereby and a second position whereat said pipe is located in said apparatus for engagement by said two heads, said shaft being adapted to be drivingly connected to a shaft motor means for rotating said pipe transfer members between said first and second positions, each of said pipe transfer members having a portion for receiving said pipe for transfer from said first position to said second position, said shaft having a clutch means engageable with and disengageable from at least some of said pipe transfer members opposite said chain for control of rotation thereof between said first and said second positions, each clutch means having a control means connected thereto for disengaging the clutch means upon engagement by an actuating element carried by said second head, said actuating element being positioned for engaging those control means which regulate rotation of those pipe transfer members opposite said second head when it is at a given position along said chain.

3. The combination of claim 2 characterized by said control means being a pivoted lever having a first arm connected to its clutch means and a second arm having a lock element positioned for engagement with its pipe transfer member when its clutch means is disengaged to lock its pipe transfer member in said first position, and by spring means connected to said clutch means for normally urging engagement thereof with its pipe transfer member.

4. The combination of claim 2 characterized by each of said pipe transfer members being disks, each having a peripheral notch for receiving thereinto said pipe and for maintaining said pipe therein during travel from said first position to said second position, by said control means being a pivoted lever having a first arm connected to said clutch means and a second arm having a lock element positioned for engagement with its disk when its clutch means is disengaged to lock its disk in said first position, and by spring means connected to said clutch means for normally urging engagement of each of said clutch means with its disk.

5. The disk of claim 4 characterized by said peripheral notch including a hook portion positioned to engage said pipe when at said second position and hold it upon said saddle and by a pipe lift arm connected to said notch opposite said hook portion and disposed to remove said pipe from said second position for conveyance out of said apparatus as said disk travels from said second position to said first position.

6. The combination of claim 1 characterized by said second head mounting first and second probe means, each of said probe means being disposed in advance of said second head, positioned to engage an end portion of said pipe and on that side of said second head from which pipe is delivered into said apparatus for locating an end of the next pipe to be delivered into said apparatus, said first probe means being spaced apart from said second one and in advance thereof towards said first head, said first and second probe means being connected to signal producing means which generates a first signal when neither probe means contacts said next pipe, which generates a second signal when said first probe means contacts said next pipe and a third signal when both said probe means contact said next pipe.

7. In apparatus for subjecting pipe to internal hydraulic pressures, said apparatus having a frame and a first head for sealingly engaging one end of a length of pipe, the combination comprising a second head for engaging the opposite end of said pipe, said second head being spaced apart from said first head and being disposed upon said frame for movement therealong towards and away from said first head, said second head being adapted to be drivingly connected to motor means for moving it over a path of travel towards and away from said first head, a shaft extending longitudinally of said frame along at least a part of the length of said path of travel and being laterally of said two heads, a plurality of spaced apart pipe transfer members mounted upon said shaft along its length and disposed substantially transversely thereof, said pipe transfer members being rotatable between a first position whereat a pipe is received thereby and a second position whereat said pipe is located in said apparatus for engagement by said two heads, said shaft being adapted to be drivingly connected to a shaft motor means for rotating said pipe transfer members between said first and second positions, each of said pipe transfer members having a portion for receiving said pipe for transfer from said first position to said second position, said shaft having a clutch means engageable with and disengageable from at least some of said pipe transfer members opposite said path of travel for control of rotation thereof between said first and said second positions, each clutch means having a control means connected thereto for disengaging the clutch means upon engagement by an actuating element carried by said second head, said actuating element being positioned for engaging those control means which regulate rotation of those pipe transfer members opposite said second head when it is at a given position along said path of travel.

8. The combination of claim 7 characterized by said control means being a pivoted lever having a first arm connected to its clutch means and a second arm having a lock element positioned for engagement with its pipe transfer member when its clutch means is disengaged to lock its pipe transfer member in said first position, and by spring means connected to said clutch means for normally urging engagement thereof with its pipe transfer member.

9. The combination of claim 7 characterized by each of said pipe transfer members being disks, each having a peripheral notch for receiving thereinto said pipe and for maintaining said pipe therein during travel from said first position to said second position, by said control means being a pivoted lever having a first arm connected to said clutch means and a second arm having a lock element positioned for engagement with its disk when its clutch means is disengaged to lock its disk in said first position, and by spring means connected to said clutch means for normally urging engagement of each of said clutch means with its disk.

10. The disk of claim 9 characterized by said peripheral notch including a hook portion positioned to engage said pipe when at said second position and by a pipe lift arm connected to said notch opposite said hook portion and disposed to remove said pipe from said second position for conveyance out of said apparatus as said disk travels from said second position to said first position.

11. The combination of claim 7 characterized by said second head mounting first and second probe means, each of said probe means being disposed in advance of said second head, positioned to engage an end portion of said pipe and on that side of said second head from which pipe is delivered into said apparatus for locating an end of the next pipe to be delivered into said apparatus, said first probe means being spaced apart from said second one and in advance thereof towards said first head, said first and second probe means being connected to signal producing means which generates a first signal when neither probe means contacts said next pipe, which generates a second signal when said first probe means contacts said next pipe and a third signal when both said probe means contact said next pipe.

12. In apparatus for performing an operation upon an elongated article, said apparatus having a frame and a first member for engaging one end portion of said article, the combination comprising a chain disposed on said frame, extending longitudinally thereof for movement therealong and in engagement with a sprocket carried by said frame, a carriage connected to said chain and movable therewith, said carriage mounting a second member for engaging the opposite end portion of said article, at least one saddle mounted upon said chain intermediate said two members for supporting said article between its ends, said saddle being movable with said chain, said chain being adapted to be drivingly connected to motor means for moving it along said frame to cause said carriage and said saddle to travel a path towards and away from said first member, said sprocket being disposed between said members and spaced apart from said first member so that said chain travels therearound into and out of said path of travel of said carriage at a location spaced apart from said first member and so that said saddle travels therearound into and out of a position at a lower level on said frame than said carriage and out of said path of travel of said carriage when said second member reaches a given place along said frame.

13. The combination of claim 12 characterized by a shaft extending longitudinally of said frame along at least a part of the length of said chain and being laterally of said two members, a plurality of spaced apart article transfer elements mounted upon said shaft along its length and disposed substantially transversely thereof, said article transfer elements being rotatable between a first position whereat said article is received thereby and a second position whereat said article is located in said apparatus for engagement by said two members, said shaft being adapted to be drivingly connected to shaft motor means for rotating said article transfer elements between said first and second positions, each of said article transfer elements having a portion for receiving said article for transfer from said first position to said second position, said shaft having a clutch means engageable with and disengageable from at least some of said article transfer elements opposite said chain for control of rotation thereof between said first and second positions, each clutch means having a control means connected thereto for disengaging the clutch means upon engagement by an actuating element carried by said second member, said actuating element being positioned for engaging those control means which regulate rotation of those article transfer elements opposite said second member when it is at a given position along said chain.

14. The combination of claim 13 characterized by each of said article transfer elements being disks, each having a peripheral notch for receiving thereinto said article and for maintaining said article therein during travel from said first position to said second position, by said control means being a pivoted lever having a first arm connected to its clutch and a second arm having a lock means positioned for engagement with its article transfer element when its clutch means is disengaged to lock its article transfer element in said first position and by spring means connected to said clutch means for normally urging engagement thereof with its article transfer element.

15. The disk of claim 14 characterized by said peripheral notch including a hook portion positioned to engage said article when at said second position and thereby assist in holding it thereat and by an article lift arm connected to said notch opposite said hook portion and disposed to remove said article from said second position for conveyance out of said apparatus as said disk travels from said second position to said first position.

16. The combination of claim 12 characterized by said second member mounting first and second probe means, each of said probe means being disposed in advance of said second member, positioned to engage an end portion of said article and on that side of said second member from which an article is delivered into said apparatus for locating an end of the next article to be delivered into said apparatus, said first probe means being spaced apart from said second one and in advance thereof towards said first member, said first and second probe means being connected to signal producing means which generates a first signal when neither probe means contacts said next article, which generates a second signal when said first probe means contacts said next article and a third signal when both said probe means contact said next article.

17. In apparatus for performing an operation upon an elongated article, said apparatus having a frame and a first member for engaging one end portion of said article, the combination comprising a second member for engaging the opposite end portion of said article, said second member being spaced apart from said first member and being disposed upon said frame for movement therealong towards and away from said first member, said second member being adapted to be drivingly connected to motor means for moving it over a path of travel towards and away from said first member, a shaft extending longitudinally of said frame along at least a part of the length of said path of travel and being laterally of said two members, a plurality of spaced apart article transfer elements mounted upon said shaft along its length and disposed substantially transversely thereof, said article transfer elements being rotatable between a first position whereat said article is received thereby and a second position whereat said article is located in said apparatus for engagement by said two members, said shaft being adapted to be drivingly connected to shaft motor means for rotating said article transfer elements between said first and second positions, each of said article transfer elements having a portion for receiving said article for transfer from said first position to said second position, said shaft having a clutch means engageable with and disengageable from at least some of said article transfer elements opposite said path of travel for control of rotation thereof between said first and second positions, each clutch means having a control means connected thereto for disengaging the clutch means upon engagement by an actuating element carried by said second member, said actuating element being positioned for engaging those control means which regulate rotation of those article transfer elements opposite said second member when it is at a given position along said path of travel.

18. The combination of claim 17 characterized by said control means being a pivoted lever having a first arm connected to its clutch means and a second arm having a lock means positioned for engagement with its article transfer element when its clutch means is disengaged to lock its article transfer element in said first position and by spring means connected to said clutch means for normally urging engagement thereof with its article transfer element.

19. The combination of claim 17 characterized by each of said article transfer elements being disks, each having a peripheral notch for receiving thereinto said article and for maintaining said article therein during travel from said first position to said second position, by said control means being a pivoted lever having a first arm connected to its clutch means and a second arm having a lock means positioned for engagement with its article transfer element when its clutch means is disengaged to lock its article transfer element in said first position and by spring means connected to said clutch means for normally urging engagement thereof with its article transfer element.

20. The disk of claim 19 characterized by said peripheral notch including a hook portion positioned to engage said article when at said second position and thereby assist in holding it thereat, and by an article lift arm connected to said notch opposite said hook portion and disposed to remove said article from said second position for conveyance out of said apparatus as said disk travels from said second position to said first position.

21. The combination of claim 17 characterized by said second member mounting first and second probe means, each of said probe means being disposed in advance of said second member, positioned to engage an end portion of said article and on that side of said second member from which an article is delivered into said apparatus for locating an end of the next article to be delivered into said apparatus, said first probe means being spaced apart from said second one and in advance thereof towards said first member, said first and second probe means being connected to signal producing means which generates a first signal when neither probe means contacts said next article, which generates a second signal when said first probe means contacts said next article and a third signal when both said probe means contact said next article.

References Cited in the file of this patent

UNITED STATES PATENTS

| | | |
|---|---|---|
| 2,692,565 | Cummings | Oct. 26, 1954 |
| 2,751,781 | McConnell | June 26, 1956 |
| 2,820,573 | McConnell | Jan. 21, 1958 |
| 2,907,202 | McConnell | Oct. 6, 1959 |
| 2,986,029 | Musial | May 30, 1961 |